(12) United States Patent
Kutsen

(10) Patent No.: US 8,602,468 B2
(45) Date of Patent: Dec. 10, 2013

(54) APPARATUS FOR COUPLING TO A CHAIN

(76) Inventor: Gregory Kutsen, Seabrook, TX (US)

( * ) Notice: Subject to any disclaimer, the term of this patent is extended or adjusted under 35 U.S.C. 154(b) by 0 days.

(21) Appl. No.: 13/431,035

(22) Filed: Mar. 27, 2012

(65) Prior Publication Data

US 2013/0257071 A1 Oct. 3, 2013

(51) Int. Cl.
*F16G 15/00* (2006.01)
*F16G 17/00* (2006.01)

(52) U.S. Cl.
USPC ..................................... 294/82.1; 294/82.17

(58) Field of Classification Search
USPC ............ 294/82.1, 82.11, 82.13, 82.14, 82.17, 294/82.2, 74; 24/599.4, 698.1, 698.8; 59/93, 85
See application file for complete search history.

(56) References Cited

U.S. PATENT DOCUMENTS

| | | | | |
|---|---|---|---|---|
| 2,048,277 A | * | 7/1936 | Mays | 294/82.1 |
| 3,984,899 A | * | 10/1976 | Northe | 294/82.14 |
| 4,149,369 A | * | 4/1979 | Smetz | 24/116 R |
| 4,363,509 A | * | 12/1982 | Schreyer | 294/82.1 |
| 5,127,219 A | * | 7/1992 | Herron et al. | 294/82.17 |
| 5,851,040 A | * | 12/1998 | Fredriksson | 294/82.11 |

* cited by examiner

*Primary Examiner* — Paul T Chin
(74) *Attorney, Agent, or Firm* — Richard J. Hepner

(57) ABSTRACT

An apparatus for coupling to a chain comprises a one-piece, generally hook-shaped body having a hole passing through the body, the hole configured to accommodate attachment of a first element of a load path, such as a rope or a cable, to the body; an entry slot configured to accommodate passage of a link of a chain into the body; and a capture slot configured to accept and mechanically capture a link of a chain, thereby establishing a tension load path from the first element, through the body of the apparatus, to the chain.

14 Claims, 4 Drawing Sheets

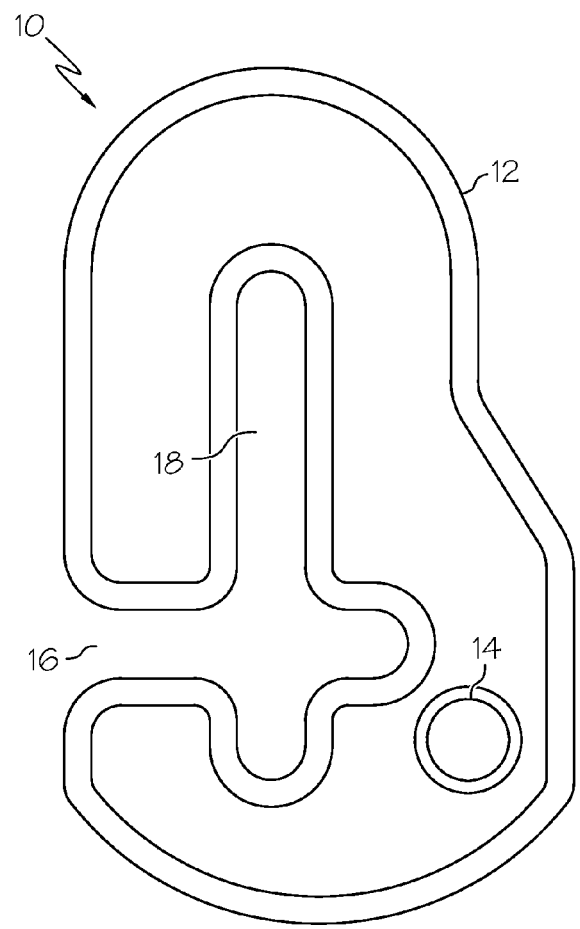
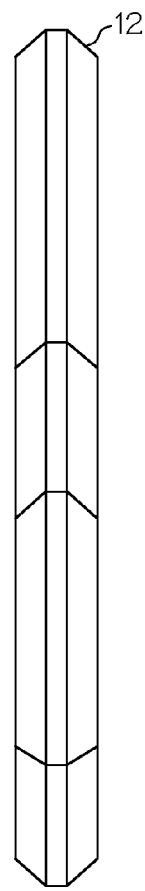
FIG. 1A
FIG. 1B

APPARATUS FOR COUPLING TO A CHAIN

FIELD OF THE INVENTION

The present invention generally relates to the field of load handling hardware. More specifically, the present invention relates to apparatus for mechanically coupling a chain into a load path; such as marine anchor ground tackle; cargo handling, storage and transportation; industrial tooling; and towing.

BACKGROUND OF THE INVENTION

The field of load handling hardware includes many applications in which it is necessary to mechanically couple equipment to a chain. Examples include coupling an anchor rode to an anchor chain, coupling two chains together, and shortening the effective length of a chain.

Conventional load handling hardware coupling element designs include swivel eye hooks, bow shackles, quick-release snap shackles, trigger release shackles, harness clips, spring clips, and eye hooks. Examples of each of these conventional devices may be found on the Denver Rope website at <http://denverrope.com/chain-hardware.htm>, accessed 7 Mar. 2012.

Many of these conventional designs, including eye hooks, spring clips, harness clips, trigger release shackles, snap shackles, and bow shackles, have moving parts that may be damaged by hard use or the marine environment. Some conventional designs, such as swivel eye hooks, snap shackles and bow shackles, have complex load paths through swiveling mechanisms or threaded components. Conventional designs that feature multiple parts, such as bow shackles, are susceptible to loss of removable parts, such as the threaded pin of the bow shackle. Such conventional designs may not be sufficiently secure, strong and/or rugged for stressing load applications and environments.

Conventional designs, particularly those with moving parts such as threaded fasteners, do not lend themselves to quick and simple coupling and/or uncoupling of a chain.

The cost to manufacture conventional designs is driven by factors such as the complexity of fabrication, machining operations such as thread cutting, and/or assembly of multiple parts.

As can be understood, there is a need for a simple, inexpensive, strong, and rugged apparatus for quickly and securely coupling to a chain.

SUMMARY OF THE INVENTION

In view of the limitations and disadvantages inherent to conventional apparatus for coupling to a chain, it is an object of the present invention to provide an apparatus for coupling to a chain that is inexpensive to manufacture, simple to use while quickly and securely coupling to a chain, and strong and rugged in use.

According to one aspect of the present invention (hereinafter "chain hook"), a chain hook comprises a one-piece, generally hook-shaped body having a hole passing through the body, the hole configured to accommodate attachment of a first element of a load path, such as a rope or a cable, to the body; an entry slot configured to accommodate passage of a link of a chain into the body; and a capture slot configured to accept and mechanically capture a link of a chain, thereby establishing a tension load path from the first element, through the body of the apparatus, to the chain.

As will be appreciated by one skilled in the related art, the one-piece chain hook may be inexpensive to manufacture, and designed and configured to be strong and rugged in use.

According to one aspect of the invention, the chain hook may be used by inserting a first link of a chain into the entry slot, aligning a second link, that is adjacent to the first link, with the capture slot, and sliding the second link into the capture slot, thereby coupling the chain hook to the chain.

As will be appreciated by one skilled in the related art, the chain hook may be used to simply and quickly couple to a chain.

According to another aspect of the invention, a chain hook may be designed and configured to couple two chains, by capturing one link of each chain, or to adjust the effective load-path of a single chain, by capturing two links of the single chain. In this aspect, a chain hook comprises a one-piece, generally hook-shaped body having an entry slot configured to accommodate passage of a link of a chain into the body, and a capture slot configured to accept and mechanically capture two chain links, thereby coupling two chains, or adjusting the effective load-bearing length of a single chain.

These and other objects, features, aspects and advantages of the present invention will become apparent to those with skill in the art from the following figures, descriptions and claims. As will be appreciated by those with skill in the art, the apparatus and method of the present invention may be implemented in a plurality of equivalent embodiments. Such alternative embodiments, and their attendant objects, aspects and advantages, are within the scope of the present invention and, therefore, the examples set forth herein shall not be limiting.

BRIEF DESCRIPTION OF THE DRAWINGS

The nature of this invention, as well as all its objects, aspects and advantages, will become readily apparent and understood upon reference to the following detailed description when considered in conjunction with the accompanying drawings, in which like reference numerals designate like parts throughout the figures thereof, and wherein:

FIG. 1 presents front and side views of an apparatus for coupling to a chain, according to one exemplary embodiment of the invention;

DETAILED DESCRIPTION OF THE INVENTION

Figures 2, 2A:
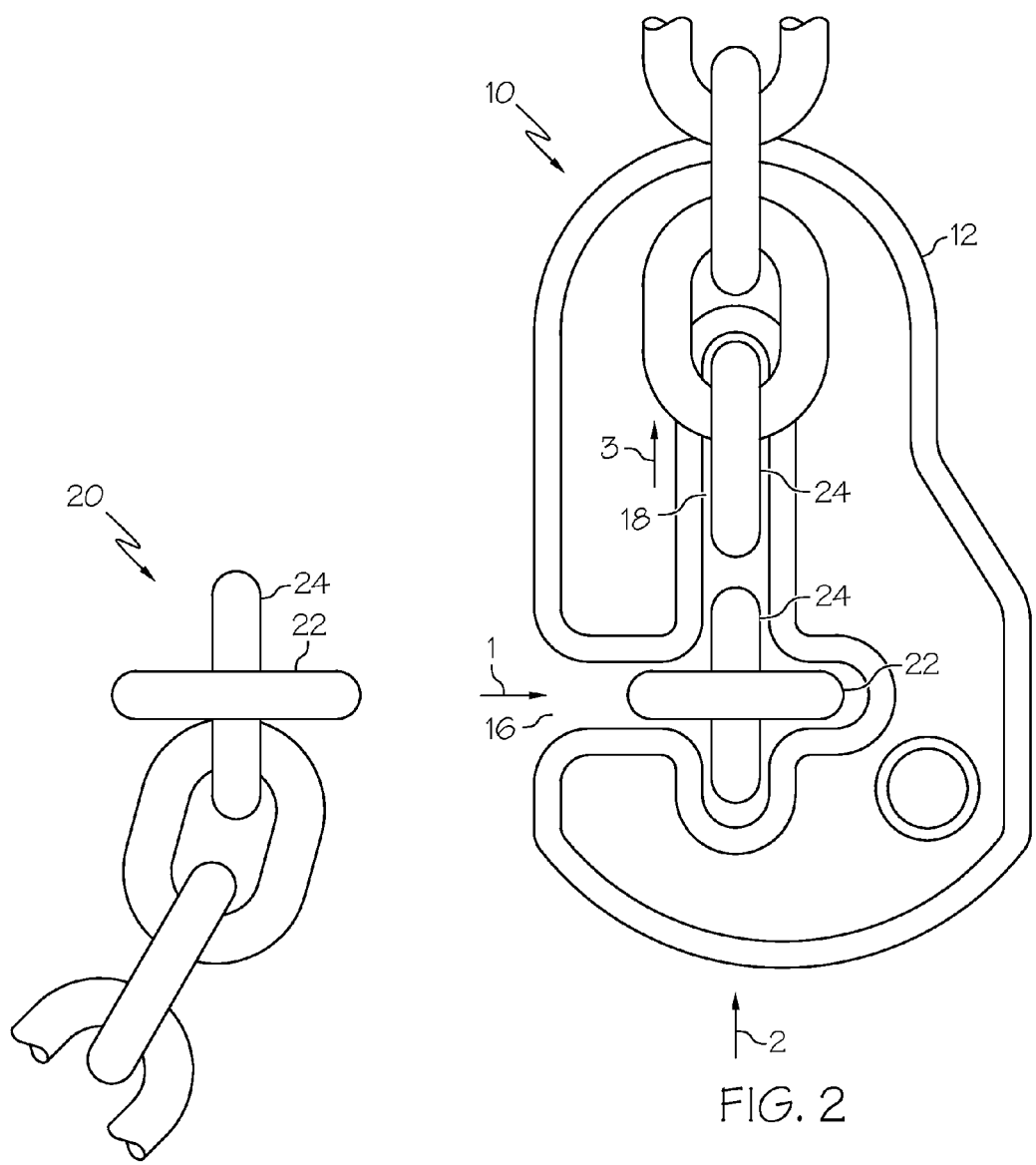
FIG. 2 illustrates a method of coupling the apparatus of FIG. 1 to a chain, according to an exemplary embodiment of the invention.

The following description is provided to enable any person skilled in the art to make and use the invention, and sets forth the best modes contemplated by the inventor of carrying out the invention. The present invention shall not be limited to the examples disclosed. Rather, the scope of the invention shall be as broad as the claims will allow.

Various inventive features are described below that can each be used independently of one another or in combination with other features. However, any single inventive feature may not address any of the disadvantages discussed above, or may only address one of the disadvantages discussed above.

Further, one or more of the disadvantages discussed above may not be fully addressed by any of the features described below.

Broadly, embodiments of the present invention generally provide an improved apparatus for coupling to, and uncoupling from a chain. More specifically, the apparatus of the present invention comprises a one-piece body with no moving parts that is inexpensive to manufacture, simple to use while quickly and securely coupling to a chain, and strong and rugged in use. The apparatus of the present invention is an improvement over conventional apparatus for coupling to a chain.

Referring now to the drawings, FIG. 1 presents front and side views of a chain hook 10, according to one exemplary embodiment of the invention. FIG. 1A presents a front view of the chain hook 10; FIG. 1B presents a side view of the chain hook 10. The chain hook 10 may comprise a one-piece, generally hook-shaped body 12. As illustrated in FIG. 1, the body 12 may comprise a substantially solid structure, having no internal cavity. The body 12 may have a hole 14 passing through the body 12, the hole 14 configured to accommodate attachment of a first element of a load path to the body 12. The body 12 may further have an entry slot 16 and a capture slot 18 passing generally perpendicularly through the body 12. The width of the entry slot 16 and the capture slot 18 may be sized to accommodate the thickness of a link of a chain. The entry slot 16 and the capture slot 18 may be oriented generally perpendicularly to one another, and may intersect to form a generally cross-shaped pattern through which links of a chain may pass. The entry slot 16 may have a short side, configured to accommodate passage of a link of a chain through the body 12, and an extended side that may extend through one side of the body 12, thereby forming an opening for a link of a chain to be inserted into the entry slot 16. The capture slot 18 may have a short side, configured to accommodate passage of a link into the body 12, and an elongated side, configured to accept and mechanically capture a link of a chain.

In alternative embodiments of the invention, a chain hook may be made from more than one piece.

In an alternative embodiment of the invention, the hole 14 may be replaced by a slot, by a plurality of holes, or by a combination of a plurality of holes and/or slots.

FIG. 2 illustrates a method of coupling a chain hook 10 to a chain 20, according to an exemplary embodiment of the invention. The method may include the following steps. A first link 22 of a chain 20 may be inserted into the entry slot 16 of the chain hook 10, and may be slid into the entry slot 16 until the chain 20 may be generally located at the intersection of the entry slot 16 and the capture slot 18. A second link 24, that is adjacent to the first link 22, may be aligned with the capture slot 18 of the chain hook 10. The second link 24 may be slid into the elongated side of the capture slot 18, thereby mechanically capturing the second link 24 within the chain hook 10. The links adjacent to the second link 24 effectively lock the second link 24 into the capture slot 18, thereby coupling the chain hook 10 to the chain 20.

Figure 3A:
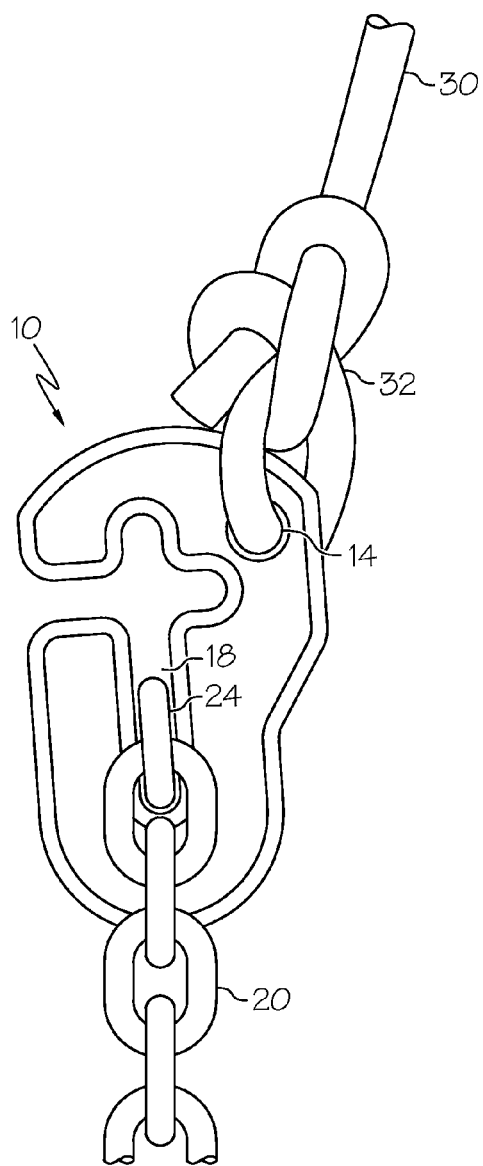
FIG. 3 presents front views of the apparatus of FIG. 1 in use, according to two exemplary embodiments of the invention.

FIG. 3A illustrates a tension load path from a rope 30 through a chain hook 10 to a chain 20, according to one alternative embodiment. In this embodiment, a link 24 may be captured in the elongated side of the capture slot 18, thereby coupling the chain hook 10 to the chain 20. The rope 30 may be mechanically attached to the chain hook 10 by threading an end of the rope 30 through the hole 14 in the chain hook 10 and tying a knot 32 in the end of the rope 30.

Figure 3B:
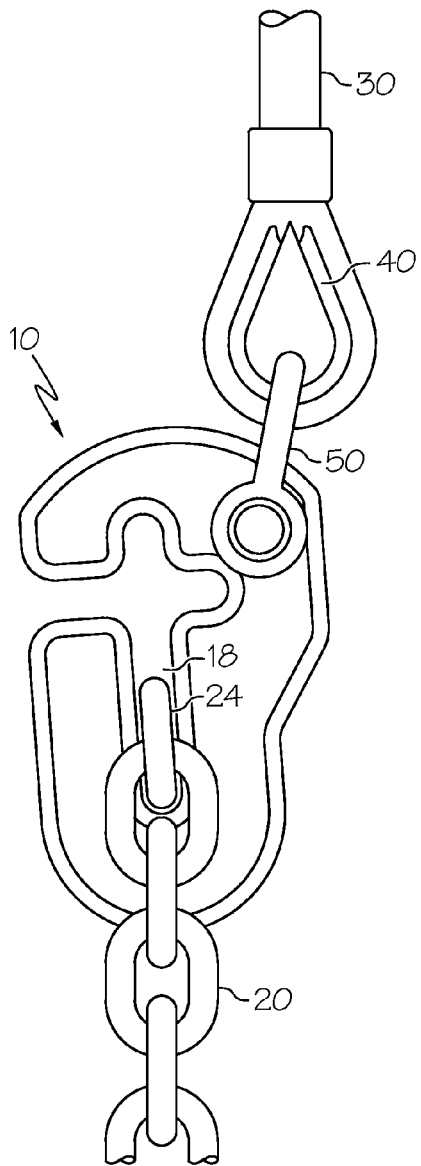

FIG. 3B illustrates an alternative means of attaching a rope 30 to a chain hook 10. In this embodiment, a thimble splice 40 is incorporated into an end of a rope 30, and a bow shackle 50 is employed to mechanically attach the rope 30 to the chain hook 10.

A chain hook 10 may be made of any useful material, including but not limited to lead, brass, aluminum or galvanized steel. Material selection may consider factors such as the load to be carried by the chain hook 10, the method of manufacture, and the environment in which the chain hook 10 may be used.

A chain hook 10 may be manufactured according to various manufacturing processes, including but not limited to casting in its final form or machining the chain hook 10 from a billet.

In alternative embodiments of the invention, the chain hook 10 may be sized to accommodate various chain sizes.

In alternative embodiments of the invention, the physical relationship between the hole 14 and the intersection of the entry slot 16 and the capture slot 18 may be modified, thereby modifying the geometry of the load path. For example, the hole 14 may be aligned with the centerline of the capture slot 18.

In alternative embodiments of the invention, load-bearing elements other than a rope 30, such as a wire, a cable, or a chain, may be attached to a chain hook 10. In addition, load-bearing elements may be coupled to the hole 14 in a chain hook 10 by a variety of means, such as threading a cable loop through the hole 14 or using supplemental attachment components, such as shackles, hooks or clips.

Figure 4A:
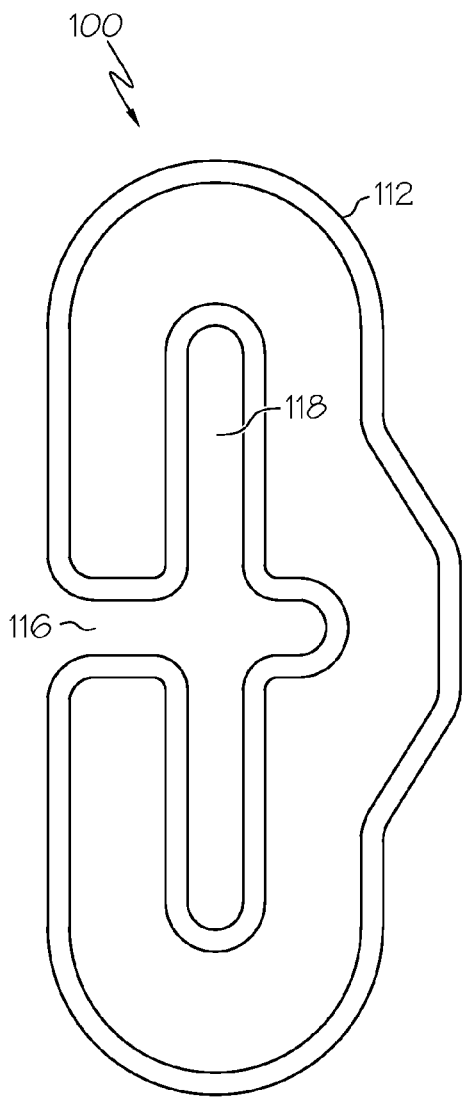
FIG. 4 presents one front view of an apparatus for coupling two chains together, according to another exemplary embodiment of the invention, and one front view illustrating the apparatus in use.

FIG. 4A presents a front view of a chain hook 100 for coupling two chains together, according to another exemplary embodiment of the invention. In this embodiment, the chain hook 100 may comprise a one-piece, generally hook-shaped body 112. As illustrated in FIG. 4A, the body 112 may comprise a substantially solid structure, having no internal cavity. The body 112 may have an entry slot 116 and a capture slot 118 passing generally perpendicularly through the body 112. The width of the entry slot 116 and the capture slot 118 may be sized to accommodate the thickness of a link of a chain. The entry slot 116 and the capture slot 118 may be oriented generally perpendicularly to one another, and may intersect to form a generally cross-shaped pattern through which links of a chain may pass. The entry slot 116 may have a short side, configured to accommodate passage of a link of a chain into the body 112, and an extended side that may extend through one side of the body 112, thereby forming an opening for a link of a chain to be inserted into the entry slot 116. The capture slot 118 may be elongated on each side of the intersection with the entry slot 116 such that a link may be captured in each side of the capture slot 118.

Figure 4B:
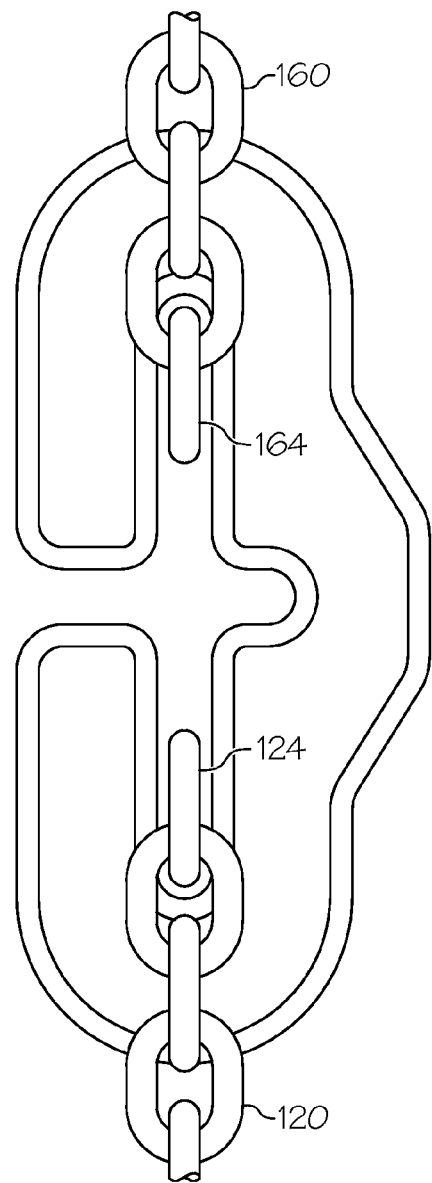

FIG. 4B presents a front view illustrating the chain hook 100 in use, according to an exemplary embodiment of the invention. In this embodiment, a link 124 of a first chain 120 may be captured in one side of the capture slot 118, and a link 164 of a second chain 160 may be captured in the other side of the capture slot 118, thereby establishing a tension load path from the first chain 120, through the body 112 of the chain hook 100, to the second chain 160.

The chain hook 100 of FIG. 4 may also be used to shorten or adjust the effective load-carrying length of a chain by capturing two links of that chain.

In alternative embodiments of the invention, the two sides of the capture slot 118 may be configured with different widths to accommodate coupling two chains having different sized links.

As can be appreciated by those skilled in the art, embodiments of the present invention provide a simple, inexpensive, strong and rugged apparatus for quickly and securely coupling to a chain.

It is within the contemplated scope of the present invention that the chain hook may be applied to any field wherein there exists a need to couple to one or more chains; such as marine anchor ground tackle; cargo handling, storage and transportation; industrial tooling; and towing.

It should be understood, of course, that the foregoing relates to exemplary embodiments of the invention, and that modifications may be made without departing from the spirit and scope of the invention as set forth in the following claims. The elements of the device may be modified, interchanged, separated or combined, or additional elements added without departing from the spirit of the invention. The invention may be practiced in alternative embodiments other than those illustrated in the Figures. Such modifications, combinations, additions and alternatives are within the contemplation of the present invention. The exemplary embodiments disclosed are not intended to limit the scope of this invention. Accordingly, the scope of the invention should be determined not by the embodiments illustrated, but by their legal equivalents, and shall be as broad as the claims will allow.

What is claimed is:

1. An apparatus for coupling to a chain, said chain having a plurality of links, comprising:
    a body designed and configured to attach to, and conduct a load between a first load-bearing element and second load bearing element, said first load-bearing element comprising a chain, said body comprising a substantially solid structure and having:
        a first slot and a second slot passing generally perpendicularly through said body, said first slot and said second slot oriented generally perpendicularly to one another and intersecting one another to form a generally cross-shaped pattern through which the links of said chain may pass, the width of said first slot and said second slot being sized to accommodate the thickness of a link of said chain, and wherein:
            said first slot is divided by said intersection with said second slot into a short side, configured to accommodate passage of a link of said chain through said body, and an extended side that extends through one side of said body, thereby forming an opening in said body for a link of said chain to be inserted into said first slot; and
            said second slot is divided by said intersection with said first slot into a short side, configured to accommodate passage of a link of said chain through said body, and an elongated side, configured to accept and mechanically capture a link of said chain; and
        an attachment feature configured to accommodate attachment of said second load bearing element to said body.

2. The apparatus according to claim 1, wherein said body is constructed of one piece.

3. The apparatus according to claim 1, wherein said body is generally hook shaped.

4. The apparatus according to claim 1, wherein said first structural element is a rope.

5. The apparatus according to claim 1, wherein said first structural element is a cable.

6. The apparatus according to claim 1, wherein said attachment feature comprises a hole.

7. The apparatus according to claim 1, wherein said attachment feature comprises a slot.

8. The apparatus according to claim 1, wherein said attachment feature comprises a plurality of holes and or slots.

9. An apparatus for coupling to two chains, each of said two chains having a plurality of links, comprising:
    a body designed and configured to attach to, and conduct a load between a first chain and a second chain, said body comprising a substantially solid structure and having:
        a first slot and a second slot passing generally perpendicularly through said body, said first slot and said second slot oriented generally perpendicularly to one another and intersecting one another to form a generally cross-shaped pattern through which the links of said first chain and said second chain may pass, the width of said first slot and said second slot being sized to accommodate the thickness of links of said first chain and said second chain, and wherein:
            said first slot is divided by said intersection with said second slot into a short side, configured to accommodate passage of links of said first chain and said second chain through said body, and an extended side that extends through one side of said body, thereby forming an opening in said body for links of said first chain and said second chain to be inserted into said first slot; and
            said second slot is divided by said intersection with said first slot into a first side and a second side, said first side configured to accept and mechanically capture a link of said first chain, and said second side configured to accept and mechanically capture a link of said second chain.

10. The apparatus according to claim 9, wherein said body is constructed of one piece.

11. The apparatus according to claim 9, wherein said body is generally hook shaped.

12. An apparatus for coupling to two links of a chain, said chain having a plurality of links, comprising:
    a body designed and configured to attach to, and conduct a load between a first link of said chain and a second link of said chain, said body comprising a substantially solid structure and having:
        a first slot and a second slot passing generally perpendicularly through said body, said first slot and said second slot oriented generally perpendicularly to one another and intersecting one another to form a generally cross-shaped pattern through which the links of said chain may pass, the width of said first slot and said second slot being sized to accommodate the thickness of links of said chain, and wherein:
            said first slot is divided by said intersection with said second slot into a short side, configured to accommodate passage of links of said chain through said body, and an extended side that extends through one side of said body, thereby forming an opening in said body for links of said chain to be inserted into said first slot; and
            said second slot is divided by said intersection with said first slot into a first side and a second side, said first side configured to accept and mechanically capture a first link of said chain, and said second side configured to accept and mechanically capture a second link of said chain.

13. The apparatus according to claim 12, wherein said body is constructed of one piece.

14. The apparatus according to claim 12, wherein said body is generally hook shaped.

* * * * *